(12) United States Patent
Kanazawa

(10) Patent No.: US 7,242,728 B2
(45) Date of Patent: Jul. 10, 2007

(54) QUADRATURE MODULATOR CARRIER QUADRATURE ERROR DETECTION METHOD AND QUADRATURE MODULATION DEVICE

(75) Inventor: Norio Kanazawa, Ebina (JP)

(73) Assignee: Anritsu Corporation, Atsugi-shi (JP)

( * ) Notice: Subject to any disclaimer, the term of this patent is extended or adjusted under 35 U.S.C. 154(b) by 737 days.

(21) Appl. No.: 10/482,437

(22) PCT Filed: May 23, 2003

(86) PCT No.: PCT/JP03/06444

§ 371 (c)(1),
(2), (4) Date: Dec. 30, 2003

(87) PCT Pub. No.: WO03/101061

PCT Pub. Date: Dec. 4, 2003

(65) Prior Publication Data
US 2004/0250192 A1  Dec. 9, 2004

(30) Foreign Application Priority Data
May 24, 2002  (JP)  ............................. 2002-150879

(51) Int. Cl.
*H04K 1/02*  (2006.01)
(52) U.S. Cl. ...................................... 375/296; 375/297
(58) Field of Classification Search ................ 375/296, 375/297; 330/291, 294; 455/63.1, 126, 455/127.1, 127.2, 127.3, 127.4, 127.5
See application file for complete search history.

(56) References Cited

U.S. PATENT DOCUMENTS

| 5,293,406 A | | 3/1994 | Suzuki | |
| 5,416,441 A | * | 5/1995 | Nagano | 330/129 |
| 5,854,971 A | * | 12/1998 | Nagoya et al. | 455/126 |
| 2004/0248528 A1 | * | 12/2004 | Rozenblit et al. | 455/126 |

FOREIGN PATENT DOCUMENTS

| JP | 5-068060 A | 3/1993 |
| JP | 11-136302 A | 5/1999 |
| JP | 2000-316031 A | 11/2000 |

* cited by examiner

*Primary Examiner*—Don N. Vo
(74) *Attorney, Agent, or Firm*—Frishauf, Holtz, Goodman & Chick, P.C.

(57) ABSTRACT

In a quadrature modulator which receives a pair of carrier signals having phases perpendicular to one another, and I and Q signals, and which outputs a modulating signal, a quadrature error based on a phase difference between the pair of carrier signals is detected. In a state that the signal levels of the I and Q signals are each made to be zero, a pair of dc voltages for causing that the modulating signal outputted from the quadrature modulator is made to be a predetermined reference level, are each added to the I and Q signals. In a state that pairs of dc voltages are each changed and sequentially added to the I and Q signals, plural combinations of pairs of dc voltages for causing that a signal level of the modulating signal is made to be the predetermined reference level, are retrieved, and the quadrature error is calculated from simultaneous equations in which respective values of the retrieved plural combinations of pairs of dc voltages, the signal level of the modulating signal, and a quadrature error of the carrier signals are variables.

11 Claims, 7 Drawing Sheets

FIG. 5C   $(I\sin\theta + Q)^2 + (I\cos\theta)^2 = Ms^2$

FIG. 7 c1: cIN1 component included in a
c2: cIN2 component included in a

QUADRATURE MODULATOR CARRIER QUADRATURE ERROR DETECTION METHOD AND QUADRATURE MODULATION DEVICE

This application is a U.S. National Phase Application under 35 USC 371 of International Application PCT/JP03/06444 filed May 23, 2003.

TECHNICAL FIELD

The present invention relates to a carrier quadrature error detecting method of a quadrature modulator, and a quadrature modulating apparatus, and in particular, to a carrier quadrature error detecting method of a quadrature modulator detecting a quadrature error in a modulator output of a pair of carrier signals input to the quadrature modulator, and a quadrature modulating apparatus to which the carrier quadrature error detecting method is applied.

BACKGROUND ART

Figure 8:
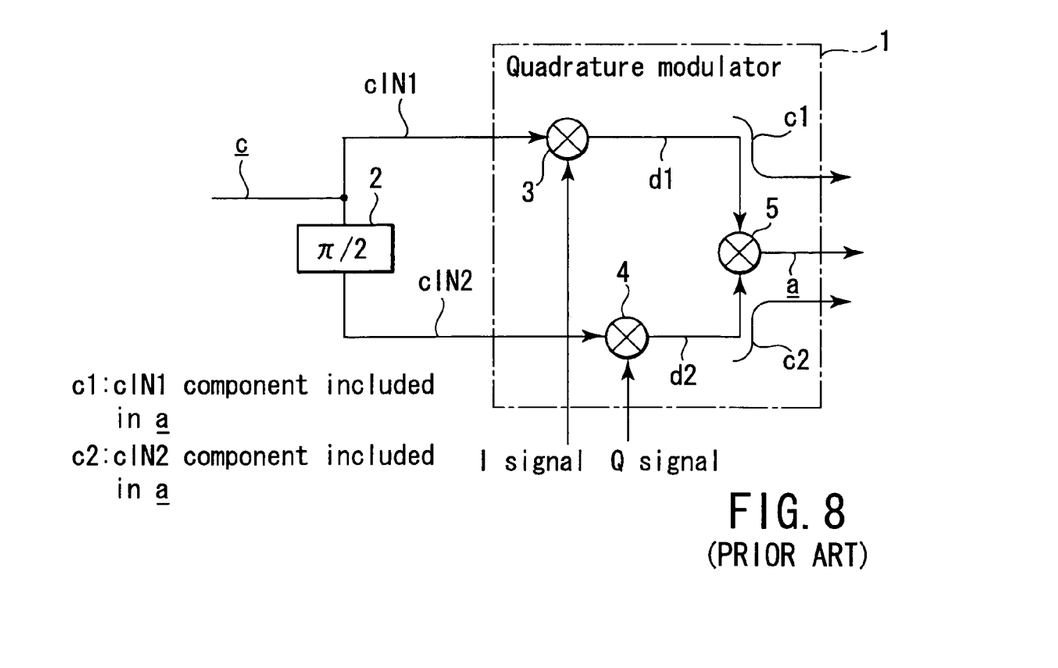
FIG. 8 is a block diagram showing a conventional general quadrature modulator.

FIG. 8 is a block diagram showing a schematic structure of a conventional general quadrature modulator.

Namely, in this quadrature modulator, a carrier signal $c$ input from the exterior is directly applied as a new carrier signal $c_{IN1}$ to a quadrature modulator 1, and the carrier signal which is phase-shifted by 90° at a 90 degree phase-shifter 2 is applied as a new carrier signal $c_{IN2}$ to the quadrature modulator 1.

Further, the respective carrier signals $c_{IN1}$ and $c_{IN2}$ applied to the quadrature modulator 1 whose phases are perpendicular to one another, are respectively applied to multipliers 3 and 4.

An I signal (in phase component) and a Q (quadrature component) signal are respectively applied to the multipliers 3 and 4.

Multiplier 3 multiplies the carrier signal $c_{IN1}$ by the I signal, and outputs a multiplied signal $d_1$ to the adder 5.

Multiplier 4 multiplies the carrier signal $c_{IN2}$ by the Q signal, and outputs a multiplied signal $d_2$ to the adder 5.

The adder 5 adds the multiplied signals d1 and d2 respectively output from the multipliers 3 and 4, and outputs a modulating signal (a quadrature modulating signal) $a$.

In such a quadrature modulator 1, it is supposed that a case arises that the phases of a pair of carrier signal components $c_1$ and $c_2$ included in the modulating signal $a$ output from the quadrature modulator 1 are not precisely perpendicular to one another due to, for example, a setting defect or an error of the 90 degree phase-shifter 2, and an error in the propagation delay time from the multipliers 3 and 4 to the adder 5.

In such a case, when the modulating signal a obtained by applying the I signal and the Q signal to the quadrature modulator 1 is demodulated into two signals by another quadrature modulator, a situation arises that the two demodulated signals are not completely separated into an I signal component and a Q signal component, and one signal component (information) leaks to the demodulated other signal component (information).

Accordingly, when the quadrature modulator 1 is built into various communication systems, it is necessary to measure a quadrature degree of the phases between the pair of carrier signal components $c_1$ and $c_2$ included in the output modulating signal $a$, and to suppress a quadrature error $\theta$ to less than or equal to a given tolerance limit.

In order to measure a quadrature error $\theta$ based on the phase difference between the pair of carrier signal components $c_1$ and $c_2$ input in the quadrature modulator 1, in a state that complex sine-wave signals serving as a reference are applied as the I signal and the Q signal, image (waveform) information of the modulating signal $a$ output from the quadrature modulator 1 is analyzed by a measuring device such as a spectrum analyzer or the like.

Further, while the image (waveform) information of the modulating signal $a$ is being monitored by the measuring device such as a spectrum analyzer or the like, separately, a phase difference between the carrier signal components $c_1$ and $c_2$ is adjusted so as to be 90° by a phase adjuster.

However, in the method described above, measuring devices such as a precision complex sine-wave signal generator, a high-priced spectrum analyzer, or the like are specially required.

However, it is practically impossible that such a complex and high-priced measuring device is built into a quadrature modulating apparatus.

Moreover, the adjusting operation that the phase difference between the carrier signal components $c_1$ and $c_2$ are adjusted by the use of the complex sine-wave signal generator and the spectrum analyzer is complex, and executed by the intuition and the experience of a skilled operator. However, individual differences among adjustment operators greatly affect results of adjustment, and there is the concern that the adjusted results greatly fluctuate.

Further, there is the problem that an operator who is inexperienced in the adjustment cannot execute the adjusting operation.

DISCLOSURE OF INVENTION

An object of the present invention is to provide a carrier quadrature error detecting method of a quadrature modulator in which, in a state that dc voltages are added with respect to the I signal and the Q signal, due to a quadrature error of carrier signals being calculated, a precision complex sine-wave signal generator, and a measuring device such as a high-priced spectrum analyzer or the like are not required, and the quadrature error of the carrier signals can be detected automatically and high-accurately without intervention of an operator, and even if the operator is inexperienced in the adjusting operation, the detection of a quadrature error of carrier signals and the adjustment of a quadrature degree of carrier signals can be efficiently executed, and to provide a quadrature modulating apparatus to which the carrier quadrature error detecting method is applied.

To achieve the above object, according to a first aspect of the present invention, there is provided a carrier quadrature error detecting method of a quadrature modulator which receives a pair of carrier signals having phases perpendicular to one another, and I and Q signals, quadrature-modulates the pair of carrier signals by the I and Q signals, and outputs a modulating signal, detects a quadrature error based on a phase difference between the pair of carrier signals at a modulator output of the quadrature modulator, the quadrature error detecting method of the quadrature modulator comprising:

adding a pair of dc voltages for causing that the modulating signal output from the quadrature modulator is made to be a predetermined reference level, to the I and Q signals, respectively, in a state that signal levels of the I and Q signals are respectively made to be zero;

retrieving plural combinations of pairs of dc voltages for causing that a signal level of the modulating signal output from the quadrature modulator is made to be the predetermined reference level, in a state that the pairs of dc voltages are respectively changed and sequentially added to the I and Q signals; and calculating the quadrature error from simultaneous equations in which respective values of retrieved plural combinations of pairs of dc voltages, the signal level of the modulating signal output from the quadrature modulator, and a quadrature error of the carrier signals are variables.

To achieve the above object, according to a second aspect of the present invention, there is provided a quadrature error detecting method of the quadrature modulator according to the first aspect, wherein the plural combinations of pairs of dc voltages are two.

To achieve the above object, according to a third aspect of the present invention, there is provided a quadrature error detecting method of the quadrature modulator according to the first aspect, wherein the plurality of combinations of pairs of dc voltages are four.

To achieve the above object, according to a fourth aspect of the present invention, there is provided a quadrature error detecting method of the quadrature modulator according to the third aspect, wherein carrier-leak adjusting voltages are included in the variables of the simultaneous equations.

To achieve the above object, according to a fifth aspect of the present invention, there is provided a quadrature modulating apparatus comprising:

a quadrature modulator body (8) which receives a pair of carrier signals having phases perpendicular to one another, and I and Q signals, quadrature-modulates the pair of carrier signals by the I and Q signals and outputs a modulating signal (a);

a level detecting unit (15) which detects a signal level (M) of the modulating signal output from the quadrature modulator body;

a pair of variable voltage sources (11, 12) which generate a pair of dc voltages for being added to the I and Q signals applied to the quadrature modulator body;

a reference level judging unit (18) which judges whether or not the signal level (M) of the modulating signal detected by the level detecting unit becomes a predetermined reference level ($M_S$);

dc voltage combination retrieving means (19) for retrieving plural combinations of a pair of dc voltages for causing that the signal level of the modulating signal is made to be the predetermined reference level, in a state of being added to the I and Q signals, due to the pair of dc voltages generated by the pair of variable voltage sources being changed;

quadrature error calculating means (20) for calculating a quadrature error ($\theta$) between the pair of carrier signals from simultaneous equations in which respective values of the plural combinations of the pair of dc voltages retrieved by the dc voltage combination retrieving means, the signal level of the modulating signal output from the quadrature modulator body, the quadrature error between the pair of carrier signals, and the carrier-leak adjusting voltages are variables; and phase correcting means (7, 25) for correcting a phase difference between the pair of carrier signals by using the quadrature error calculated by the quadrature error calculating means.

To achieve the above object, according to a sixth aspect of the present invention, there is provided a quadrature modulating apparatus according to the fifth aspect, wherein the plural combinations of pairs of dc voltages retrieved by the dc voltage combination retrieving means are two.

To achieve the above object, according to a seventh aspect of the present invention, there is provided a quadrature modulating apparatus according to the fifth aspect, wherein the plural combinations of pairs of dc voltages retrieved by the dc voltage combination retrieving means are four.

To achieve the above object, according to an eighth aspect of the present invention, there is provided a quadrature modulating apparatus according to the seventh aspect, wherein carrier-leak adjusting voltages are included in the variables of the simultaneous equations calculated by the quadrature error calculating means.

To achieve the above object, according to a ninth aspect of the present invention, there is provided a quadrature modulating apparatus according to the fifth aspect, wherein the phase correcting means includes a phase adjuster (7) which carries out adjustment of a quadrature degree between the pair of carrier signals.

To achieve the above object, according to a tenth aspect of the present invention, there is provided a quadrature modulating apparatus according to the fifth aspect, wherein the phase correcting means includes a carrier phase corrector (25) equivalently correcting an error in the quadrature degree between the pair of carrier signals in computing of the I signal and the Q signal.

To achieve the above object, according to an eleventh aspect of the present invention, there is provided a quadrature modulating apparatus comprising:

a phase variable unit (21) which receives carrier signals and outputs a first carrier signal and a second carrier signal;

a first modulator (3) which modulates the first carrier signal by an input I signal;

a second modulator (4) which modulates the second carrier signal by an input Q signal;

an adder (5) which synthesizes outputs from the first modulator and the second modulator, and outputs a quadrature modulating signal;

a level detecting unit (15) which detects an output level of the adder;

a variable voltage source (11, 12) which generates an I dc signal and a Q dc signal corresponding to the input I signal and the input Q signal; and a control unit (13) which receives a detection signal from the level detecting unit and controls the phase variable unit such that a phase difference between the first carrier signal and the second carrier signal is made to be 90°, wherein the control unit which causes the variable voltage source to generate four pairs of the I dc signal and the Q dc signal for causing that the detection signal from the level detecting unit is made to be a predetermined value, and which are different from each other, calculates a quadrature error between the first carrier signal and the second carrier signal which are included in the quadrature modulating signal output from the adder, by using the I dc signal and the Q dc signal, and controls the phase variable unit such that the quadrature error is made to be zero.

BEST MODE FOR CARRYING OUT THE INVENTION

First, the principle of operation of a carrier quadrature error detecting method of a quadrature modulator of the present invention and a quadrature modulating apparatus in which the carrier quadrature error detecting method is used will be described with reference to FIGS. 5A, 5B, and 5C.

Figure 5A:
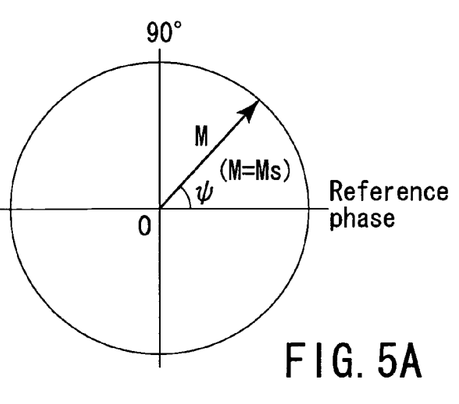
FIGS. 5A, 5B, and 5C are diagrams shown for explanation of a carrier quadrature error in the quadrature modulating apparatus of FIG. 1.
Figure 5B:
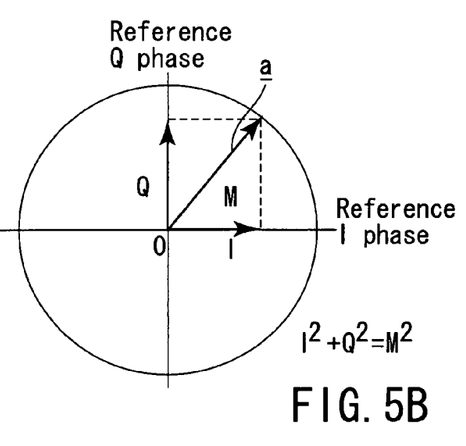

FIG. 5A is a diagram for explanation of the relationship between a signal level and a phase of a sine-wave signal.

Note that the signal level shows an absolute value level which can be measured by the use of a normal voltmeter.

Provided that a signal level M of the sine-wave signal merely satisfies the conditions for maintaining a predetermined reference level $M_S$, a phase $\phi$ with respect to the reference phase of the sine-wave signal may be of any value.

Accordingly, as shown in FIG. 5A, the sine-wave signal can be shown by the vector which has the phase $\phi$ with respect to the reference phase, and which has the absolute value (reference level) $M_S$.

Next, the relationship among an I signal and a Q signal input to the quadrature modulator, and a modulating signal $a$ output from the quadrature modulator will be described with reference to FIG. 5B.

In a quadrature modulator 1 shown in FIG. 8, when the phases of carrier signal components $c_1$, $c_2$ included in the modulating signal $a$ output from an adder 5 are precisely perpendicular to one another, the signal level M of the output modulating signal $a$ is a level in which a dc voltage I added to the I signal and a dc voltage Q added to the Q signal are vector-synthesized.

In this case, the reference phase of the modulating signal $a$ is the reference phase of the one carrier signal component $c_1$, and has the size of the dc voltage I of the I signal. Moreover, a phase shifted by 90° from the reference phase of the modulating signal $a$ is a phase of the other carrier signal component $c_2$, and has the size of the dc voltage Q of the Q signal.

In other words, in a case that the phases of the pair of carrier signal components $c_1$, $c_2$ are precisely perpendicular to one another, the signal level M of the modulating signal $a$ can be determined by vector-synthesis on a quadrature two-dimensional coordinate in which a pair of dc voltages I and Q which are added to the I signal and the Q signal, are the abscissa and the ordinate.

It is supposed that the abscissa of this condition is a reference I phase, and the ordinate of this condition is a reference Q phase.

In this case, the relationship of the signal level M of the modulating signal $a$ and the dc voltages I and Q is formula (1).

$$I^2+Q^2=M^2 \quad (1)$$

Here, it is supposed that the phases between the pair of carrier signal components $c_1$ and $c_2$ are shifted by $\theta$ from 90°.

Concretely, it is supposed that the carrier signal component $c_1$ side is shifted by $\theta$ from the reference phase, and the carrier signal component $c_2$ side is not shifted.

Figure 5C:
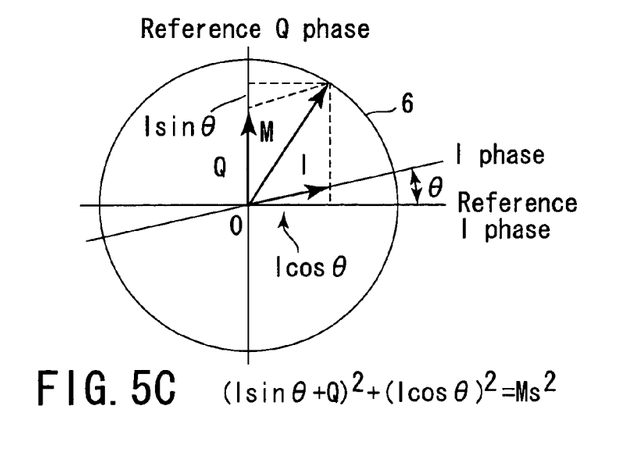

In this case, as shown in FIG. 5C, the axis of the I phase corresponding to the carrier signal component $c_1$ side is shifted by $\theta$ from the axis of the original reference I phase.

Note that the axis of the Q phase is the same as the axis of the original reference Q phase.

In this way, in the condition that the phases between the pair of carrier signal components $c_1$, $c_2$ are shifted by $\theta$ from 90° as well, it is possible to maintain the signal level A of the modulating signal $a$ output from the quadrature modulator 1 at a constant value due to the pair of dc voltages I and Q being added to the I signal and the Q signal.

However, because the axis of the I phase and the axis of the Q phase are not perpendicular to one another, it suffices that a value in which the dc voltages I and Q are converted into the original quadrature two-dimensional coordinate system satisfies formula (1) described above.

Accordingly, the relationship among the dc voltages I and Q added to the I signal and the Q signal, and the signal level M of the modulating signal $a$ in the condition that the phases between the pair of carrier signals $c_1$ and $c_2$ are shifted by $\theta$ from 90° is formula (2) due to simple geometrical consideration.

$$(I \cos \theta)^2+(Q+I \sin \theta)^2=M^2 \quad (2)$$

In order to determine a quadrature error $\theta$ between the carrier signal components $c_1$ and $c_2$ by the use of this formula (2), it is necessary to provide three variables of I, Q, M. However, provided that two pairs of combinations of the dc voltages I and Q added to the I signal and the Q signal which satisfy the condition that the signal level M of the modulating signal $a$ is equivalent, can be obtained, the quadrature error $\theta$ is univocally determined from formula (2).

With respect to this condition that the signal level M of the modulating signal $a$ is equivalent, it suffices that the combination of the dc voltages I and Q at which the tip of the vector (measuring point) of the modulating signal $a$ is positioned on the circumference of a virtual circle 6 whose radius M around the origin on the quadrature two-dimensional coordinate of the reference I phase and the reference Q phase, is determined.

Moreover, concretely, due to the dc voltages I and Q added to the I signal and the Q signal being variously changed such that the measured signal level M of the modulating signal $a$ is maintained at a reference level $M_S$, two of the combinations (two measuring points) are determined.

Further, supposing that the two combinations of the dc voltages I and Q are $(I_A, Q_A)$ and $(I_B, Q_B)$, the following simultaneous equations are produced due to these combinations $(I_A, Q_A)$ and $(I_B, Q_B)$ being substituted into formula (2).

$$(I_A \cos \theta)^2 + (Q_A + I_A \sin \theta)^2 = M_S^2$$

$$(I_B \cos \theta)^2 + (Q_B + I_B \sin \theta)^2 = M_S^2$$

In this case, provided that the condition $(Q_B = Q_A)$ is further substituted and $M_S$ is eliminated by the use of the two combinations $(I_A, Q_A)$ and $(I_B, Q_B)$ of the dc voltages I and Q, the quadrature error $\theta$ between the pair of carrier signal components $c_1$ and $c_2$ is determined by formula (3).

$$\sin \theta = [(I_A)^2 - (I_B)^2]/2(I_B \cdot Q_B - I_A \cdot Q_A) \quad (3)$$

The quadrature error $\theta$ between the pair of carrier signal components $c_1$ and $c_2$ is determined such that the signal level M of the modulating signal $\underline{a}$ is thereby maintained at a predetermined reference level $M_S$ in accordance with the two combinations $(I_A, Q_A)$ and $(I_B, Q_B)$ of the dc voltages I and Q added to the I signal and the Q signal.

However, in the quadrature modulator 1 shown in FIG. 8, a carrier-leak phenomenon, in which a carrier signal leaks to the modulating signal a, arises due to insufficient accuracy of the respective multipliers 3 and 4, and the adder 5.

In order to eliminate the carrier-leak, carrier-leak adjusting voltages $I_L$ and $Q_L$ such as a predetermined slight level of dc voltages are being always applied to the I signal and the Q signal.

Note that, supposing that the carrier-leak adjusting voltages $I_L$ and $Q_L$ are unknown, the following verification is carried out.

In this case, provided that the dc voltages actually added to the I signal and the Q signal are I' and Q', the respective dc voltages I and Q of formula (2) becomes formula (4).

$$I = I' - I_L$$

$$Q = Q' - Q_L \quad (4)$$

Accordingly, formula (2) becomes formula (5).

$$[(I' - I_L)\cos \theta]^2 + [(Q' - Q_L) + (I' - I_L)\sin \theta]^2 = M^2 \quad (5)$$

In order to determine a quadrature error $\theta$ between the pair of carrier signal components $c_1$ and $c_2$ by the use of this formula (5), it is necessary to provide five variables of I', Q', $I_L$, $Q_L$, M. However, provided that four pairs of combination of the dc voltages I' and Q' actually added to the I signal and the Q signal, which satisfy the condition that the signal level M of the modulating signal is maintained at the predetermined reference level $M_S$, can be obtained, the quadrature error $\theta$ is univocally determined from formula (5).

Supposing that the combinations of the respective dc voltages I' and Q' which satisfy the condition that the signal level M of the modulating signal $\underline{a}$ is maintained at the predetermined reference level $M_S$, are (Ia, Qa), (Ib, Qb), (Ic, Qc), and (Id, Qd), the simultaneous equations shown by formula (6) are obtained.

$$[(Ia - I_L)\cos \theta]^2 + [(Qa - Q_L) + (Ia - I_L)\sin \theta]^2 = M_S^2,$$

$$[(Ib - I_L)\cos \theta]^2 + [(Qb - Q_L) + (Ib - I_L)\sin \theta]^2 = M_S^2,$$

$$[(Ic - I_L)\cos \theta]^2 + [(Qc - Q_L) + (Ic - I_L)\sin \theta]^2 = M_S^2,$$

$$[(Id - I_L)\cos \theta]^2 + [(Qd - Q_L) + (Id - I_L)\sin \theta]^2 = M_S^2 \quad (6)$$

Provided that the predetermined reference level $M_S$ of the modulating signal $\underline{a}$, and the carrier-leak adjusting voltages $I_L$ and $Q_L$ are eliminated from the simultaneous equations, the quadrature error $\theta$ based on the phase difference between the carrier signal components $c_1$ and $c_2$ is univocally determined.

Provided that the quadrature error $\theta$ based on the phase difference between the carrier signal components $c_1$ and $c_2$ is univocally determined in this way, due to a phase difference between the carrier signals $c_{IN1}$ and $c_{IN2}$ input to the body of the quadrature modulator being adjusted at a phase adjuster, the phase difference between the carrier signal components $c_1$ and $c_2$ can be precisely adjusted to 90°.

Hereinafter, respective embodiments of the present invention will be described with reference to the drawings.

FIRST EMBODIMENT

Figure 1:
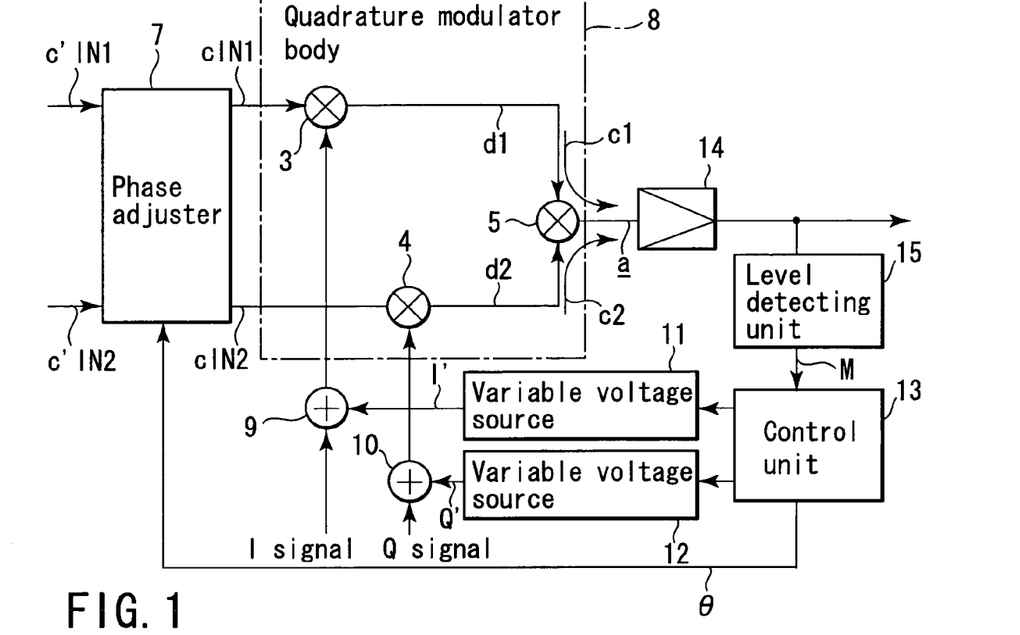
FIG. 1 is a block diagram showing a schematic structure of a quadrature modulating apparatus to which a carrier quadrature error detecting method of a quadrature modulator relating to a first embodiment of the present invention is applied.

FIG. 1 is a block diagram showing a schematic structure of a quadrature modulating apparatus to which a carrier quadrature error detecting method of a quadrature modulator relating to a first embodiment of the present invention is applied.

In FIG. 1, portions which are the same as those of the conventional quadrature modulator shown in FIG. 8 are denoted by the same reference numerals, and detailed description of repetitive portions will be omitted.

A pair of carrier signals $c'_{IN1}$ and $c'_{IN2}$, having phases perpendicular to one another, input from the exterior are respectively applied via the phase adjuster 7 as new carrier signals $c_{IN1}$ and $c_{IN2}$ to the respective multipliers 3 and 4 in the quadrature modulator body 8.

The I signal and the Q signal are respectively applied to the respective multipliers 3 and 4.

The one multiplier 3 multiplies the carrier signal $c_{IN1}$ by the I signal, and applies a multiplied signal $d_1$ to the adder 5.

The other multiplier 4 multiplies the carrier signal $c_{IN2}$ by the Q signal, and applies a multiplied signal $d_2$ to the adder 5.

The adder 5 adds the multiplied signals $d_1$ and $d_2$ output from the respective multipliers 3 and 4, and outputs a modulating signal $\underline{a}$.

Further, adders 9 and 10 are inserted between the signal paths of I signal and the Q signal with respect to the quadrature modulator body 8.

The respective adders 9 and 10 inserted between the signal paths of I signal and the Q signal respectively add the dc voltages I' and Q' from respective variable voltage sources 11 and 12, to the I signal and the Q signal.

The respective variable voltage sources 11 and 12 which generate the dc voltages I' and Q' to be added to the I signal and the Q signal, are controlled by a control unit 13 composed of a computer.

Further, the modulating signal $\underline{a}$ output from the quadrature modulator body 8 is transmitted to the exterior after being passed through a high frequency circuit 14 including an amplifier, and is applied to a level detecting unit 15.

The level detecting unit 15 detects a signal level M of the input modulating signal $\underline{a}$, and transmits it to the control unit 13.

Figure 2:
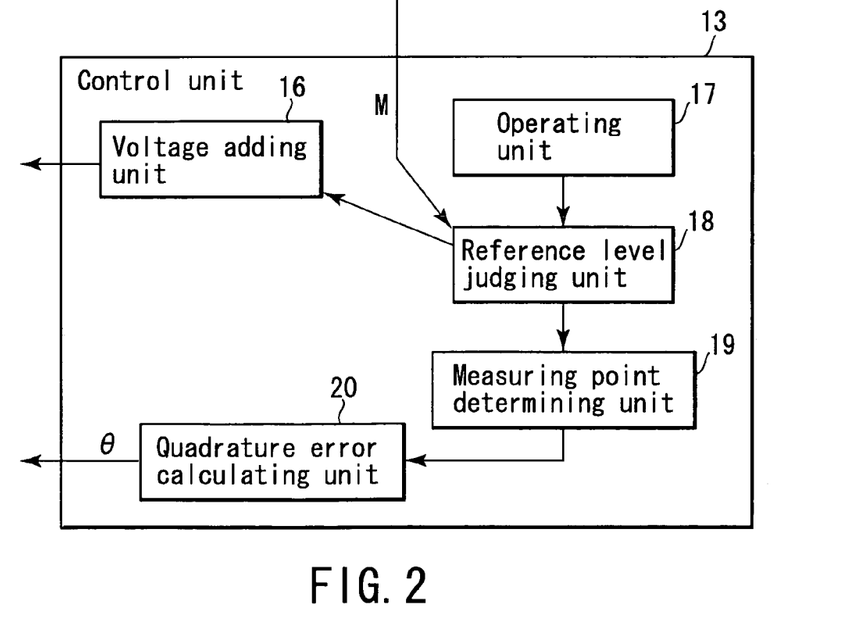
FIG. 2 is a block diagram showing a detailed structure of a control unit built into the quadrature modulating apparatus of FIG. 1.

FIG. 2 is a block diagram showing a schematic structure of the control unit 13 composed of a computer.

A voltage adding unit 16 designating the dc voltages I' and Q' added to the I signal and Q signal from the respective variable voltage sources 11 and 12, an operating unit 17, a reference level judging unit 18 judging the signal level M of the modulating signal $\underline{a}$ output from the quadrature modulator body 8, as the predetermined reference level $M_S$, a measuring point determining unit 19, a quadrature error calculating unit 20, or the like are built into in the control unit 13.

Note that the measuring point determining unit 19 retrieves four measuring points A(Ia, Qa), B(Ib, Qb), C(Ic, Qc), and D(Id, Qd), on the circumference of the virtual circle 6 whose radius is the reference level $M_S$ of the modulating signal $\underline{a}$, around the origin on the quadrature two-dimensional coordinate formed from the reference I phase and the reference Q phase shown in FIG. 5C, and FIGS. 6A, 6B, and 6C.

Figures 6A, 6B, 6C:
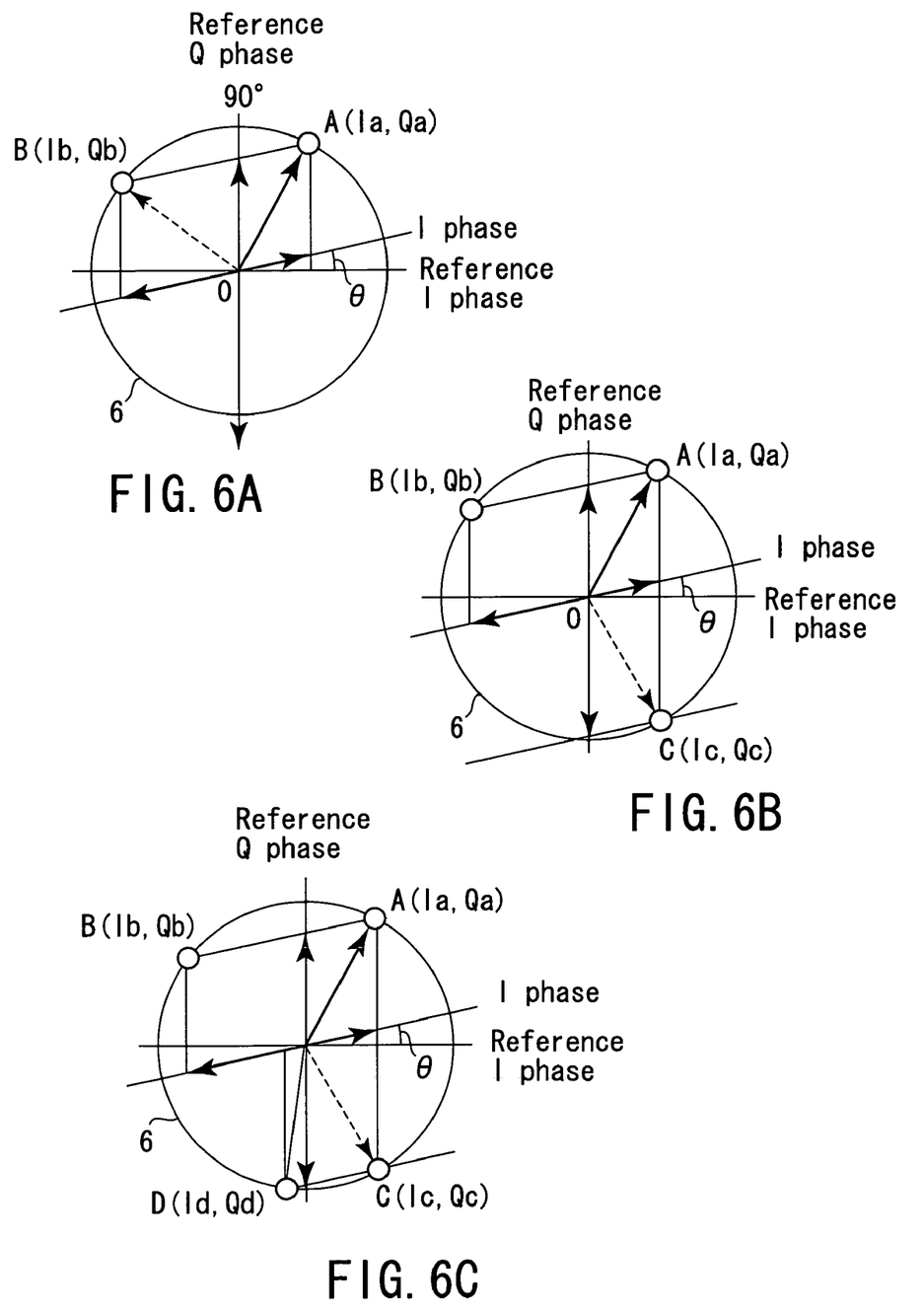
FIGS. 6A, 6B, and 6C are determining methods of respective measuring points for calculating a carrier quadrature error in the quadrature modulating apparatus of FIG. 1.

Concretely, in the process of sequentially setting the four measuring points A, B, C, and D, the respective dc voltages I' and Q' are not simultaneously changed, and the one dc voltage I' (Q') being fixed, and the other dc voltage Q' (I') being changed, and a measuring point at which the predetermined reference level $M_S$ can be obtained is retrieved.

Accordingly, in the first embodiment, condition of the following formula (7) is satisfied, and moreover, the four measuring points A, B, C, and D are set.

Qb=Qa,

Ic=Ia,

Qd=Qc          (7)

The quadrature error calculating unit 20 calculates a quadrature error θ between the pair of carrier signal components $c_1$ and $c_2$ by using formula (8) in which the simultaneous equations of formula (6) described above is adjusted by the use of the condition of formula (7).

sin θ=(Id−Ib)/2(Qa−Qc)          (8)

The quadrature error calculating unit 20 transmits a calculated quadrature error θ between the pair of carrier signal components $c_1$ and $c_2$ to a phase adjuster 7.

The phase adjuster 7 adjusts the phase difference between the pair of carrier signals $c'_{IN1}$ and $c'_{IN2}$ input from the exterior by using the calculated quadrature error θ, and makes the phases betweens the pair of carrier signal components $c_1$ and $c_2$ be precisely perpendicular to one another.

Figure 3:
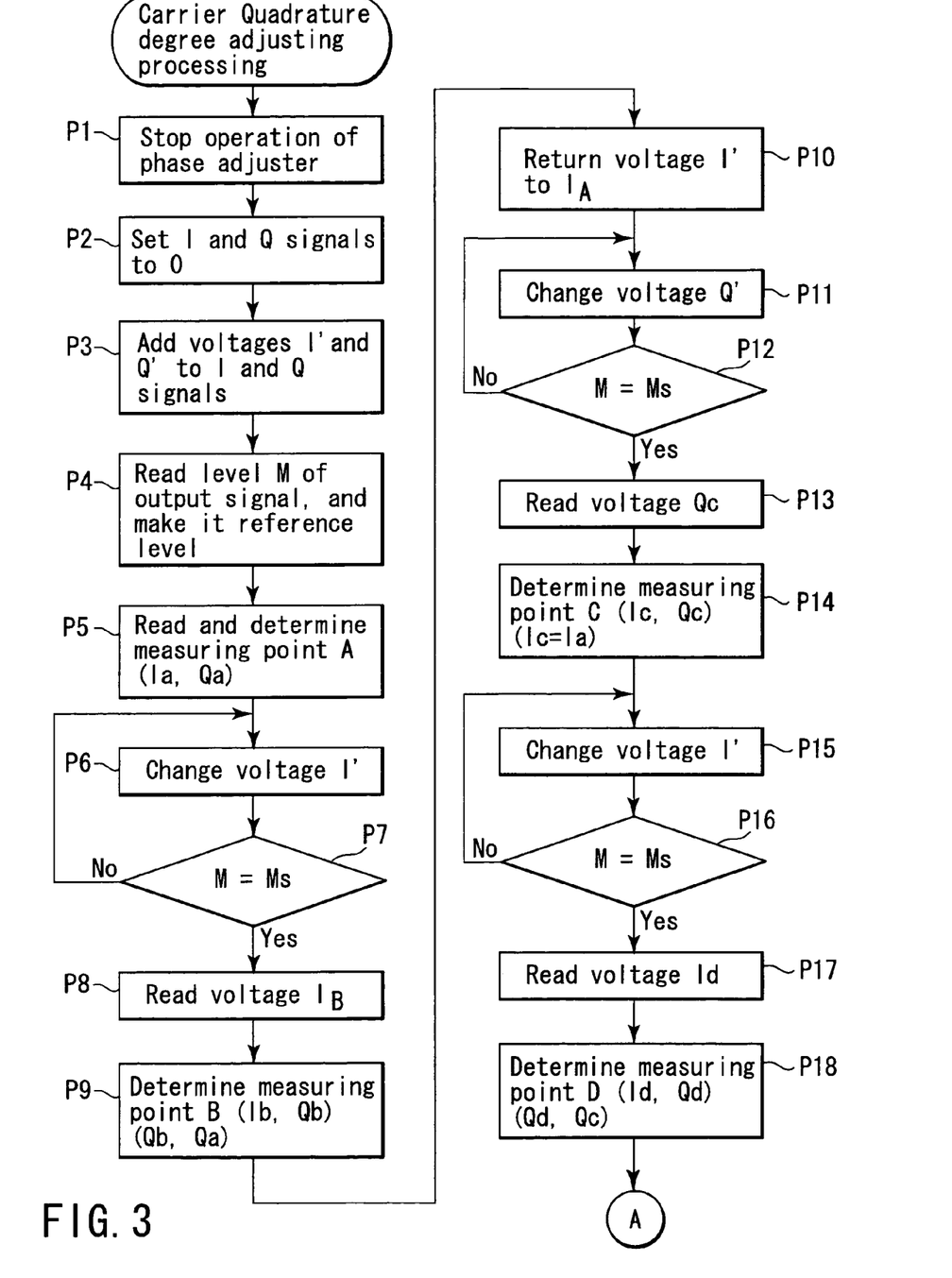
FIG. 3 is a flowchart shown for explanation the carrier quadrature degree adjusting processing operations in the quadrature modulating apparatus of FIG. 1.
Figure 4:
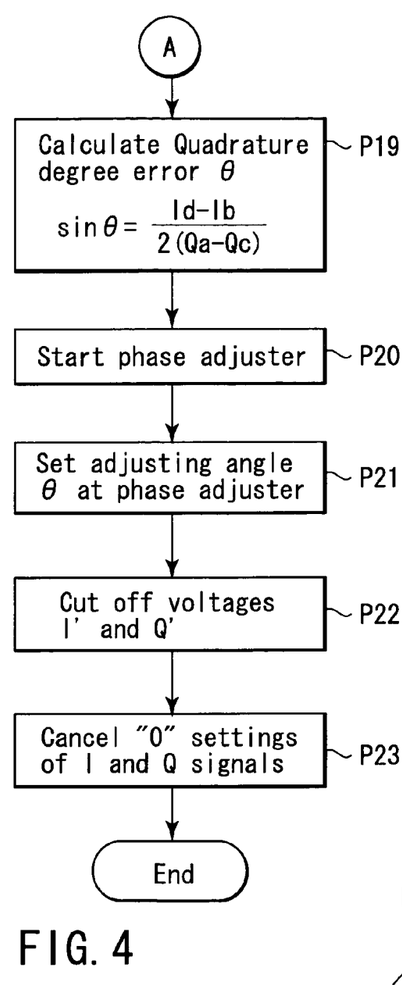
FIG. 4 is a flowchart shown for explanation of the carrier quadrature degree adjusting processing operations in the quadrature modulating apparatus of FIG. 1.

Detailed operations of carrier quadrature adjustment which the control unit 13 executes will be described in detail with reference to flowcharts of FIG. 3 and FIG. 4.

An operator stops the operation of the phase adjuster 7, and inputs the pair of carrier signals $c_1$ and $c_2$ to the quadrature modulator body 8 (step P1).

Moreover, the operator sets the signal levels of the I signal and the Q signal which have been inputted to the quadrature modulator body 8 to "0".

Concretely, the I signal and the Q signal input from the exterior cut-off and the input terminals of the I signal and the Q signal are terminated (step P2).

Next, the control unit 13 causes to generate the dc voltages I' and Q' from the variable voltage sources 11 and 12, and respectively add the dc voltages I' and Q' to the I signal and the Q signal by the adders 9 and 10 (step P3).

Further, the control unit 13 controls the respective variable voltage sources 11 and 12 such that it is judged that the signal level M of the modulating signal $\underline{a}$ output from the quadrature modulator body 8 is equal to the predetermined reference level $M_S$ by the reference level judging unit 18 (step P4).

Next, the control unit 13 regards the respective dc voltages I' and Q' added to the I signal and the Q signal at that time when the measuring point determining unit 19 is started, as the dc voltages Ia and Qa at the measuring point A shown in FIG. 6A, and defines it as the measuring point A (Ia, Qa).

In a state that the dc voltages Ia and Qa are added to the I signal and the Q signal, the vector tip of the modulating signal $\underline{a}$ is positioned at the measuring point A (Ia, Qa) on the circumference of the virtual circle 6 described above (step P5).

Next, the control unit 13 causes to fix dc voltage Qa added to the Q signal among the dc voltages Ia and Qa added to the I signal and the Q signal at the existing time, and observes the signal level M of the modulating signal $\underline{a}$ while sequentially changing dc voltage I' added to the I signal (step P6).

Further, when the signal level M agrees with the predetermined reference level $M_S$ again (step P7), the control unit 13 reads the dc voltages Ib and Qb added to the I signal and the Q signal at this time (step P8), and determines the measuring point B (Ib, Qb).

The measuring point B (Ib, Qb) as well is positioned on the circumference of the virtual circle 6 whose radius is reference level $M_S$.

In this case, because the voltage Qa added to the Q signal is fixed, naturally, Qb=Qa (step P9).

Next, the control unit 13 causes to return a dc voltage I' added to the I signal among the dc voltages Ib and Qb added to the I signal and the Q signal at the existing time, to the dc voltage Ia of the measuring point A (Ia, Qa).

Namely, the control unit 13 causes to return the dc voltages I' and Q' added to the I signal and the Q signal, to the measuring point A (Ia, Qa) (step P10).

Next, the control unit 13 causes to fix the dc voltage Ia added to the I signal among the dc voltages Ia and Qa added to the I signal and the Q signal at the existing time, and while sequentially changing the dc voltage Q' added to the Q signal (step P11), the control unit 13 observes the signal level M of the modulating signal $\underline{a}$.

Further, when the signal level M agrees with the predetermined reference level $M_S$ again (step P12), the control unit 13 reads the dc voltages Ic and Qc added to the I signal and Q signal at this time (step P13), and as shown in FIG. 6B, the control unit 13 determines the measuring point C (Ic, Qc).

The measuring point C (Ib, Qb) as well is positioned on the circumference of the virtual circle 6 whose radius is the predetermined reference level $M_S$.

In this case, because the voltage Ia added to the I signal is fixed, naturally, Ic=Ia (step P14).

Moreover, the control unit 13 causes to fix the dc voltage Qc added to the Q signal among the dc voltages Ic and Qc added to the I signal and the Q signal at the existing time, and while sequentially changing the dc voltage I' added to the I signal (step P15), the control unit 13 observes the signal level M of the modulating signal $\underline{a}$.

Further, when the signal level M agrees with the predetermined reference level $M_S$ again (step P16), the control unit 13 reads the dc voltages Ic and Qd added to the I signal and the Q signal at this time (step P17), and determines the measuring point D (Id, Qd).

The measuring point D (Id, Qd) as well is positioned on the circumference of the virtual circle 6 whose radius is the predetermined reference level $M_S$.

In this case, because the voltage Qc added to the Q signal is fixed, naturally, Qd=Qc (step P18).

Because the four measuring points A(Ia, Qa), B(Ib, Qb), C(Ic, Qc), and D(Id, Qd) positioned on the circumference of the virtual circle 6 can be thereby obtained, the control unit 13 calculates the quadrature error θ between the pair of carrier signal components $c_1$ and $c_2$ by using formula (8) described above (step P19).

$$\sin\theta = (Id - Ib)/2(Qa - Qc) \quad (8)$$

Next, the control unit 13 causes to start the phase adjuster 7 (step P20), and transmits the calculated quadrature error θ to the phase adjuster 7, adjust the phases between the pair of carrier signals $c'_{IN1}$ and $c'_{IN2}$ input from the exterior by using the calculated quadrature error θ with respect to the phase adjuster 7, and make the phases between the carrier signal components $c_1$ and $c_2$ be precisely perpendicular to one another (step P21).

When the above-described phase adjusting processing between the carrier signal components $c_1$ and $c_2$ is completed, the control unit 13 causes to cut off the respective dc voltages I' and Q' voltages added to the I signal and the Q signal (step P22), and cancel "0" settings of the I signal and the Q signal applied to the quadrature modulator body 8 (step P23).

In the quadrature modulating apparatus in accordance with the first embodiment structured in this way, in the carrier quadrature error detecting method of the quadrature modulator, and the quadrature modulating apparatus, the quadrature error θ between the pair of carrier signal components $c_1$ and $c_2$ is calculated from the four measuring points A(Ia, Qa), B(Ib, Qb), C(Ic, Qc), and D(Id, Qd) which are respectively added to the I signal and the Q signal in which the signal level M of the modulating signal a output from the quadrature modulator body 8 is maintained at the predetermined reference level $M_S$, and which are positioned on the circumference of the virtual circle 6.

Further, in the quadrature modulating apparatus in accordance with the first embodiment, because these measurement of the signal level M of the modulating signal a and setting of the four measuring points A, B, C, and D can be achieved by a simple level measuring device and simple software, a detecting function of the quadrature error θ between the pair of carrier signal components $c_1$ and $c_2$, and a phase adjusting function of the carrier signals $c_1$ and $c_2$ can be built into the quadrature modulating apparatus in low-price and simply.

Moreover, in the quadrature modulating apparatus in accordance with the first embodiment, because a precision complex sine-wave signal generator used for the conventional quadrature degree measuring method of a carrier signal, and a measuring device such as a high-priced spectrum analyzer or the like are not required, the cost of equipment can be greatly reduced, and because the quadrature error θ can be automatically measured, even if the operator is inexperienced in the measuring operation, detection of a quadrature error between the pair of carrier signals and adjustment of a quadrature degree between carrier signals can be efficiently executed.

Moreover, in the quadrature modulating apparatus in accordance with the first embodiment, even if a carrier-leak phenomenon in which carrier signals leak to the modulating signal a due to the insufficient performance of the respective multipliers 3 and 4, and the adder 5 arises, because the quadrature error θ between the pair of carrier signal components $c_1$ and $c_2$ is calculated in consideration of the existences of a certain slight carrier-leak adjusting voltages $I_L$ and $Q_L$ which are being always applied to the I signal and the Q signal, in order to eliminate the carrier-leak, a detecting accuracy of the quadrature error θ between the pair of carrier signal components $c_1$ and $c_2$ can be further improved.

SECOND EMBODIMENT

Figure 7:
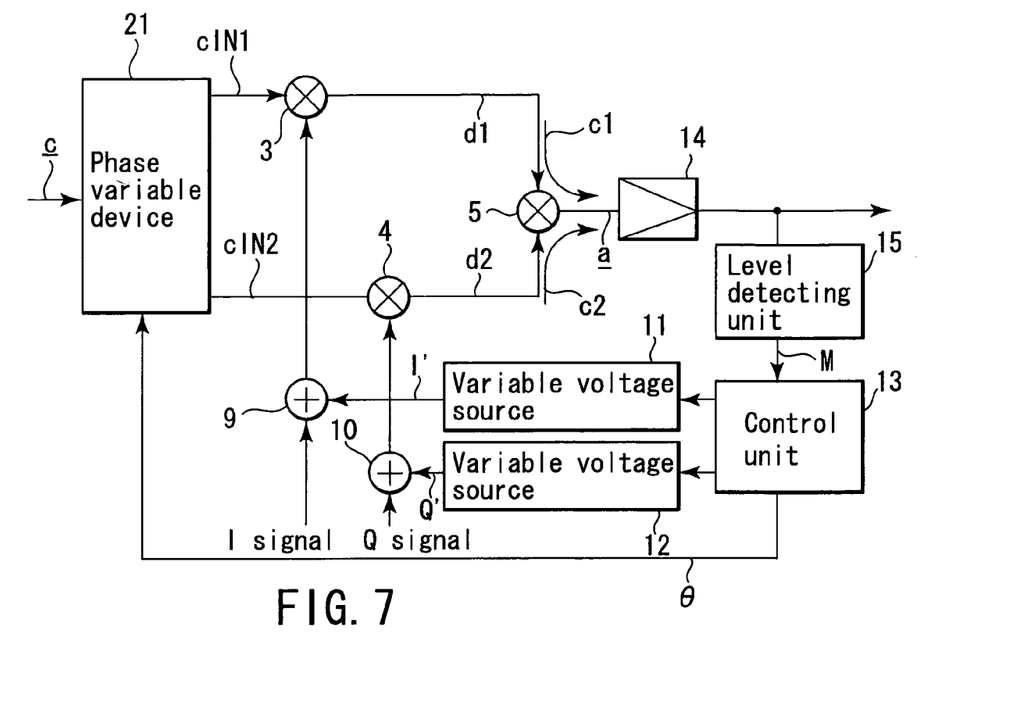
FIG. 7 is a block diagram showing a schematic structure of a quadrature modulating apparatus relating to a second embodiment of the present invention.

FIG. 7 is a block diagram showing a schematic structure of a quadrature modulating apparatus relating to a second embodiment of the present invention.

In FIG. 7, portions which are the same as those of the quadrature modulating apparatus of the first embodiment shown in FIG. 1 are denoted by the same reference numerals, and detailed description of repetitive portions will be omitted.

The carrier signal c such as a sine-wave, for example, input from the exterior is separated into first and second carrier signals $c_{IN1}$ and $c_{IN2}$ having phases different from one another, by the phase variable unit 21, and are respectively applied to the respective multipliers 3 and 4 serving as the first and second modulators.

The I signal and the Q signal are respectively applied to the respective multipliers 3 and 4.

Multiplier 3 multiplies the first carrier signal $c_{IN1}$ by the I signal, and outputs a multiplied signal $d_1$ to the adder 5.

Multiplier 4 multiplies the second carrier signal $c_{IN2}$ by the Q signal, and outputs a multiplied signal $d_2$ to the adder 5.

The adder 5 adds the multiplied signals d1 and d2 output from the respective multipliers 3 and 4, and outputs the modulating signal a.

Further, the adders 9 and 10 are inserted between the signal paths of the I signal and the Q signal with respect to the quadrature modulator body 8.

Namely, the respective adders 9 and 10 respectively add the dc voltages I' and Q' from the respective variable voltage sources 11 and 12, to the I signal and the Q signal.

The respective variable voltage sources 11 and 12 which generate the dc voltages I' and Q' added to the I signal and the Q signal, are controlled by the control unit 13 composed of a computer.

Further, the modulating signal a output from the adder 5 is transmitted to the exterior after being passed through a high frequency circuit 14 including an amplifier, and is applied to the level detecting unit 15.

The level detecting unit 15 detects a signal level M of the modulating signal a, and transmits it to the control unit 13.

In the same way as the control unit 13 in the quadrature modulating apparatus of the first embodiment shown in FIG. 1, the control unit 13 receives the signal level M of the quadrature modulating signal a detected at the level detecting unit 15, and causes to generate four pairs of I and Q dc signals differ from each other, from the variable voltage sources 11 and 12, which are such that the detected signal level M is made to be a predetermined value, and calculates a quadrature error (θ) in the modulator output (the adder 5) of the phases of the pair of carrier signal components $c_1$ and $c_2$ included in the modulating signal a output from the adder 5 by using the four pairs of combinations of the I and Q dc signals.

Further, the control unit 13 of the quadrature modulating apparatus of the second embodiment in accordance with FIG. 7 controls the phase variable unit 21 such that the calculated quadrature error becomes zero, and causes to adjust a phase difference between the carrier signals $c_{IN1}$ and $c_{IN2}$ output to the respective multipliers 3 and 4 from the phase variable unit 21.

Accordingly, the quadrature modulating apparatus of the second embodiment in accordance with FIG. 7 can carry out operational effects which are substantially the same as those of the quadrature modulating apparatus of the first embodiment in accordance with FIG. 1 as described above.

THIRD EMBODIMENT

Figures 9, 10:
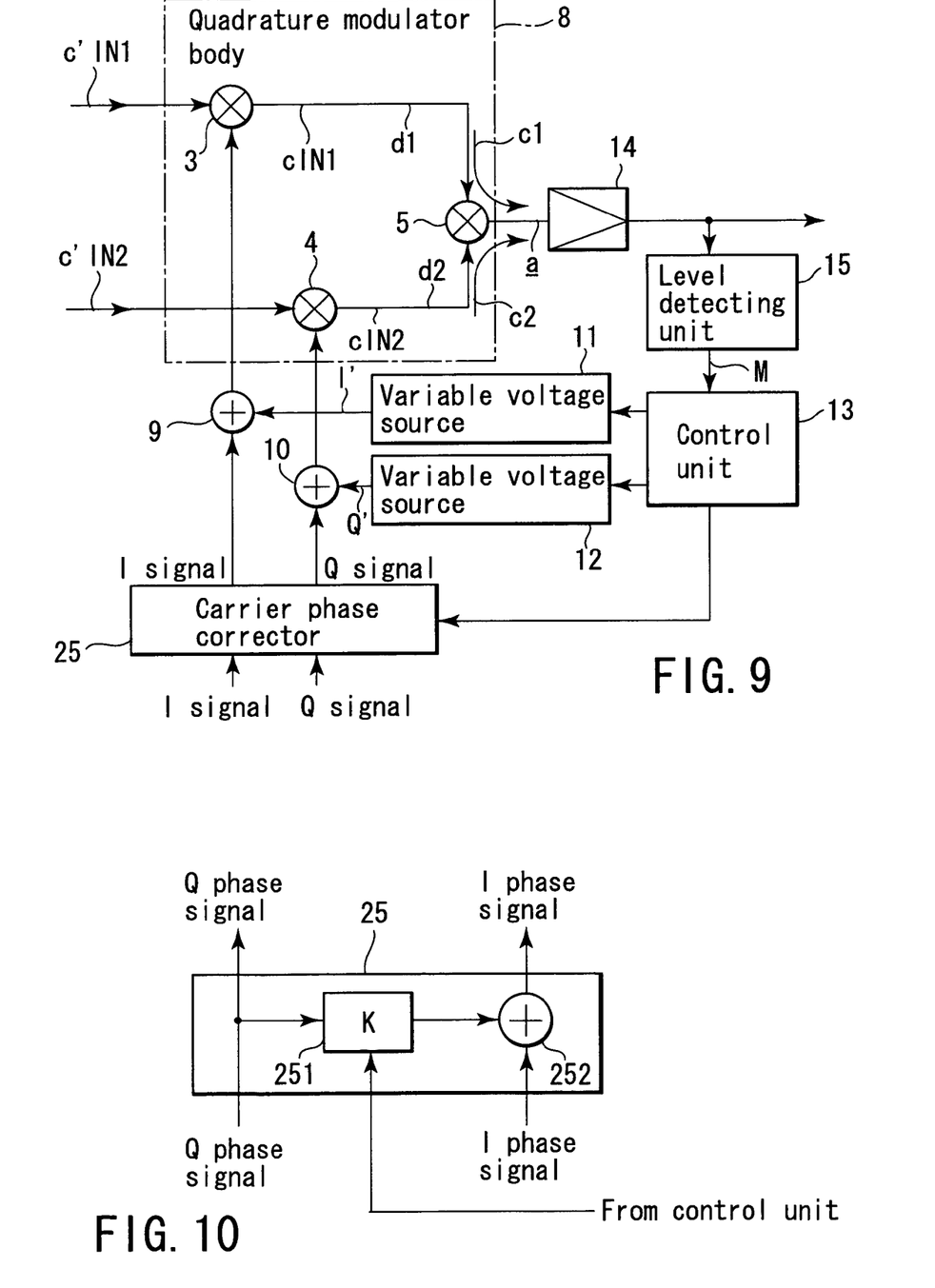
FIG. 9 is a block diagram showing a schematic structure of a quadrature modulating apparatus relating to a third embodiment of the present invention.
FIG. 10 is a block diagram showing a detailed structure of a carrier phase corrector built into the quadrature modulating apparatus of FIG. 9.

FIG. 9 is a block diagram showing a schematic structure of a quadrature modulating apparatus relating to a third embodiment of the present invention.

In FIG. 9, portions which are the same as those of the quadrature modulating apparatus of the first embodiment shown in FIG. 1 are denoted by the same reference numerals, and detailed description of repetitive portions will be omitted.

The first and second carrier signals $c'_{IN1}$ and $c'_{IN2}$ having phases different from one another input from the exterior, are respectively applied to one terminals of the respective multipliers 3 and 4 serving as the first and second modulators.

The I signal and the Q signal as will be described later are respectively applied to the other terminals of the respective multipliers 3 and 4.

Multiplier 3 multiplies the first carrier signal $c'_{IN1}$ by the I signal, and outputs a multiplied signal $d_1$ to the adder 5.

Multiplier 4 multiplies the second carrier signal $c'_{IN2}$ by the Q signal, and outputs a multiplied signal $d_2$ to the adder 5.

The adder 5 adds the multiplied signals $d_1$ and $d_2$ output from the respective multipliers 3 and 4, and outputs it as the modulating signal $\underline{a}$.

Further, the adders 9 and 10 are inserted between the signal paths of the I signal and the Q signal with respect to the quadrature modulator body 8.

Namely, the respective adders 9 and 10 inserted between the signal paths of the I signal and the Q signal respectively add the dc voltages I' and Q' from the respective variable voltage sources 11 and 12, to the I signal and the Q signal.

The respective variable voltage sources 11 and 12 which generate the dc voltages I' and Q' added to the I signal and the Q signal, are controlled by the control unit 13 composed of a computer.

Further, a carrier phase corrector 25 is inserted between the signal paths of the I signal and the Q signal in order to carry out the phase correction between the first and second carrier signals $c'_{IN1}$ and $c'_{IN2}$ by the I signal and the Q signal under the control of the control unit 13 composed of a computer.

FIG. 10 shows a concrete circuit structural example of the carrier phase corrector 25.

Namely, the carrier phase corrector 25 is formed from a correcting circuit 251 which divides the Q signal and outputs a correction signal having an amplitude opposite to that of the Q signal at the signal paths of the I signal and the Q signal, and an adder 252 adding the correction signal from the correcting circuit 251 to the I signal.

Here, the correcting circuit 251 is controlled such that an amplitude of the correction signal is made to be a predetermined level by the control unit 13 composed of a computer.

In accordance therewith, the I signal and the Q signal accompanying the carrier phase correction information are output from the carrier phase corrector 25.

Further, the I signal and the Q signal accompanying such carrier phase correction information are applied to the respective adders 9 and 10.

Further, the modulating signal $\underline{a}$ output from the adder 5 is transmitted to the exterior after being passed through the high frequency circuit 14 including an amplifier, and is applied to the level detecting unit 15.

Here, the level detecting unit 15 detects a signal level M of the input modulating signal a, and transmits it to the control unit 13.

In the same way as the control unit 13 in the quadrature modulating apparatus of the embodiment shown in FIG. 1, the control unit 13 receives the signal level M of the quadrature modulating signal $\underline{a}$ detected at the level detecting unit 15, and causes to generate four pairs of the I and Q dc signals, which are such that the detected signal level M is a predetermined value, and which differ from each other, from the variable voltage sources 11 and 12, and calculates a quadrature error ($\theta$) in the modulator output (the adder 5) based on the phase difference between the pair of carrier signal components $c_1$ and $c_2$ included in the modulating signal $\underline{a}$ output from the adder 5 by using the four combinations of the I and Q dc signals.

Further, the control unit 13 of the quadrature modulating apparatus of the third embodiment in FIG. 9 controls the carrier phase corrector 25 such that the calculated quadrature error becomes zero, and causes to apply the I signal and the Q signal accompanying the carrier phase correction information to the respective adders 9 and 10 from the carrier phase corrector 25.

In accordance therewith, the phase difference between the carrier signals $c_{IN1}$ and $c_{IN2}$ output from the respective multipliers 3 and 4 is corrected on the basis of the I signal and the Q signal accompanying the carrier phase correction information from the respective adders 9 and 10.

Here, the principle of the phase correction between the carrier signals $c_{IN1}$ and $c_{IN2}$ in the quadrature modulating apparatus of the third embodiment will be described.

Figure 11A:
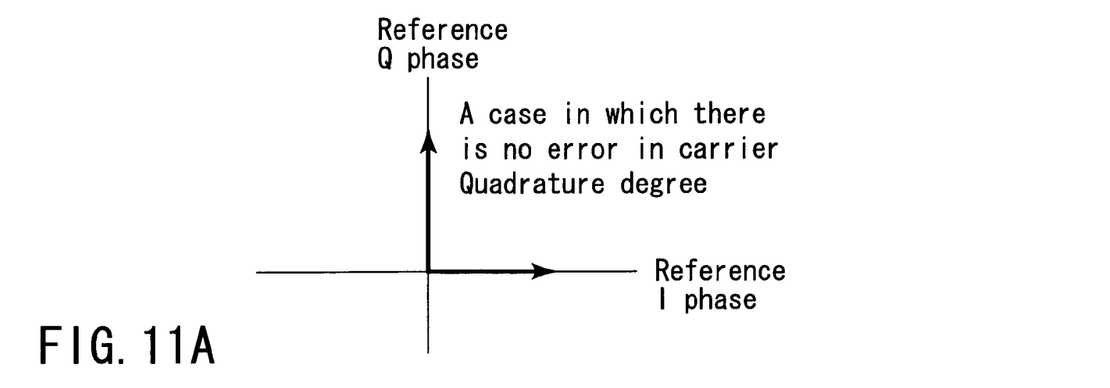
FIGS. 11A, 11B, and 11C are diagrams shown for explanation of the principal for eliminating a carrier quadrature error in the quadrature modulating apparatus of FIG. 9.

FIG. 11A shows a case that there is no error in a carrier quadrature degree between the first and second carrier signals $c'_{IN1}$ and $c'_{IN2}$.

Figure 11B:
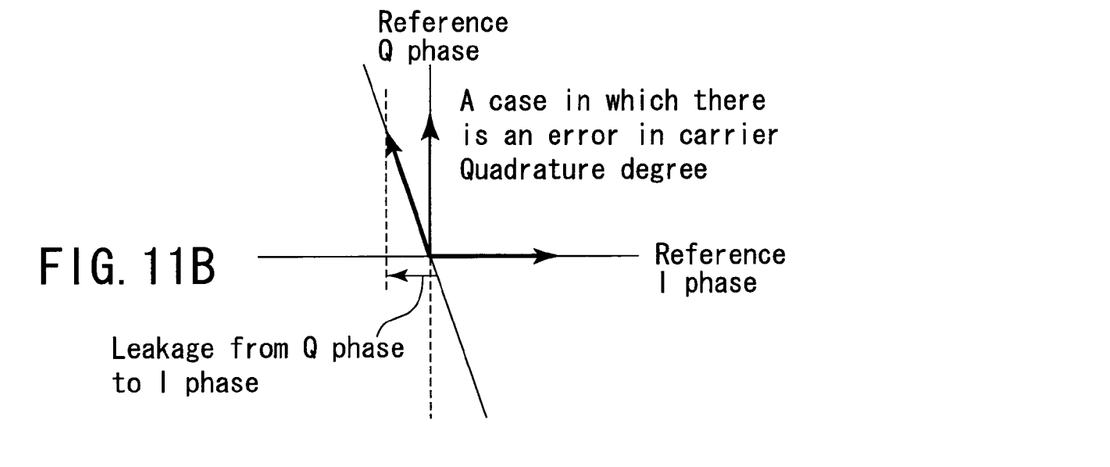

FIG. 11B shows a case that there is an error in a carrier quadrature degree between the first and second carrier signals $c'_{IN1}$ and $c'_{IN2}$.

In this case, the carrier quadrature degree being shifted is equivalent that the signal input to the Q phase leaks to the I phase at the time of being modulated in a carrier.

Figure 11C:
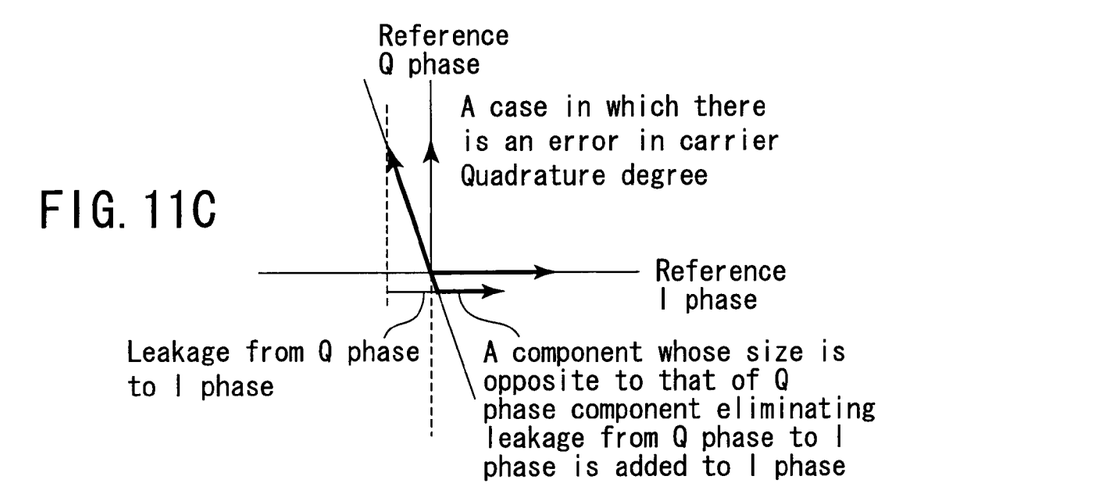

In such a case, by the carrier phase corrector 25, as shown in FIG. 11C, due to a correction signal having an amplitude opposite to an amplitude of the signal which leaks, and which is input to the Q phase being added in advance to the signal which is input to the I phase, it is possible to carry out phase correction between the carrier signals $c_{IN1}$ and $c_{IN2}$.

Namely, the quadrature modulating apparatus of the third embodiment in FIG. 9 equivalently corrects an error in the quadrature degree of the carrier signals in computing of the I signal and the Q signal.

Accordingly, the quadrature modulating apparatus of the third embodiment in accordance with FIG. 9 can achieve operational effects which are substantially the same as those of the quadrature modulating apparatus of the first embodiment in accordance with FIG. 1 which carries out adjustment of the quadrature degree of carrier signals themselves as described above.

As described above, in the carrier quadrature error detecting method of the quadrature modulator of the present invention and the quadrature modulating apparatus in which the carrier quadrature error detecting method is used, in a state that the dc voltages are added with respect to the I signal and the Q signal which are made to be zero, a quadrature error between the carrier signal components is calculated.

Accordingly, in accordance with the carrier quadrature error detecting method of the quadrature modulator of the present invention and the quadrature modulating apparatus in which the carrier quadrature error detecting method is used, a precision complex sine-wave signal generator, and measuring devices such as a high-priced spectrum analyzer or the like are not required as in the conventional art, and a quadrature error between the pair of carrier signals can be calculated automatically and highly-accurately, without intervention of an operator, and even if the operator is inexperienced in the measuring operation, detection of a quadrature error of carrier signals and adjustment of a quadrature degree of carrier signals can be efficiently executed.

Note that the present invention is not limited to the embodiments described above.

For example, supposing that the carrier-leak phenomenon described above does not arise, it suffices that the two measuring points $A(I_A, Q_A)$ and $B(I_B, Q_B)$ which respectively add to the I signal and the Q signal in which the signal level M of the modulating signal a output from the quadrature modulator body 8 is maintained at a predetermined reference level $M_S$, and which are positioned on the circumference of the virtual circle 6, are determined, and the quadrature error θ of the carrier signals $c_1$ and $c_2$ is calculated by the use of the above-described formula (3).

Accordingly, as described above in detail, in accordance with the present invention, in a state that the dc voltages are added with respect to the I signal and the Q signal, due to a quadrature error of the carrier signals being calculated, a carrier quadrature error detecting method of a quadrature modulator in which a precision complex sine-wave signal generator, and a measuring device such as a high-priced spectrum analyzer or the like are not required, and a quadrature error between the pair of carrier signals can be calculated automatically and high-accurately without intervention of an operator, and even if the operator is inexperienced in the measuring operation, detection of a quadrature error between the pair of carrier signals and adjustment of a quadrature degree between the pair of carrier signals can be efficiently executed, and a quadrature modulating apparatus to which the carrier quadrature error detecting method is applied, can be provided.

The invention claimed is:

1. A carrier quadrature error detecting method of a quadrature modulator which receives a pair of carrier signals having phases perpendicular to one another, and I and Q signals, quadrature-modulates the pair of carrier signals by the I and Q signals, and outputs a modulating signal, detects a quadrature error based on a phase difference between the pair of carrier signals at a modulator output of the quadrature modulator, the quadrature error detecting method of the quadrature modulator comprising:

adding a pair of dc voltages for causing that the modulating signal output from the quadrature modulator is made to be a predetermined reference level, to the I and Q signals, respectively, in a state that signal levels of the I and Q signals are respectively made to be zero;

retrieving plural combinations of pairs of dc voltages for causing that a signal level of the modulating signal output from the quadrature modulator is made to be the predetermined reference level, in a state that the pairs of dc voltages are respectively changed and sequentially added to the I and Q signals; and calculating the quadrature error from simultaneous equations in which respective values of retrieved plural combinations of pairs of dc voltages, the signal level of the modulating signal output from the quadrature modulator, and a quadrature error of the carrier signals are variables.

2. A quadrature error detecting method of the quadrature modulator according to claim 1, wherein the plural combinations of pairs of dc voltages are two.

3. A quadrature error detecting method of the quadrature modulator according to claim 1, wherein the plurality of combinations of pairs of dc voltages are four.

4. A quadrature error detecting method of the quadrature modulator according to claim 3, wherein carrier-leak adjusting voltages are included in the variables of the simultaneous equations.

5. A quadrature modulating apparatus comprising:

a quadrature modulator body which receives a pair of carrier signals having phases perpendicular to one another, and I and Q signals, quadrature-modulates the pair of carrier signals by the I and Q signals and outputs a modulating signal;

a level detecting unit which detects a signal level of the modulating signal output from the quadrature modulator body;

a pair of variable voltage sources which generate a pair of dc voltages for being added to the I and Q signals applied to the quadrature modulator body;

a reference level judging unit which judges whether or not the signal level of the modulating signal detected by the level detecting unit becomes a predetermined reference level;

dc voltage combination retrieving means for retrieving plural combinations of a pair of dc voltages for causing that the signal level of the modulating signal is made to be the predetermined reference level, in a state of being added to the I and Q signals, due to the pair of dc voltages generated by the pair of variable voltage sources being changed;

quadrature error calculating means for calculating a quadrature error between the pair of carrier signals from simultaneous equations in which respective values of the plural combinations of the pair of dc voltages retrieved by the dc voltage combination retrieving means, the signal level of the modulating signal output from the quadrature modulator body, the quadrature error between the pair of carrier signals, and the carrier-leak adjusting voltages are variables; and phase correcting means for correcting a phase difference between the pair of carrier signals by using the quadrature error calculated by the quadrature error calculating means.

6. A quadrature modulating apparatus according to claim 5, wherein the plural combinations of pairs of dc voltages retrieved by the dc voltage combination retrieving means are two.

7. A quadrature modulating apparatus according to claim 5, wherein the plural combinations of pairs of dc voltages retrieved by the dc voltage combination retrieving means are four.

8. A quadrature modulating apparatus according to claim 7, wherein carrier-leak adjusting voltages are included in the variables of the simultaneous equations calculated by the quadrature error calculating means.

9. A quadrature modulating apparatus according to claim 5, wherein the phase correcting means includes a phase adjuster which carriers out adjustment of a quadrature degree between the pair of carrier signals.

10. A quadrature modulating apparatus according to claim 5, wherein the phase correcting means includes a carrier phase corrector equivalently correcting an error in the quadrature degree between the pair of carrier signals in computing of the I signal and the Q signal.

11. A quadrature modulating apparatus comprising:

a phase variable unit which receives carrier signals and outputs a first carrier signal and a second carrier signal;

a first modulator which modulates the first carrier signal by an input I signal;

a second modulator which modulates the second carrier signal by an input Q signal;

an adder which synthesizes outputs from the first modulator and the second modulator, and outputs a quadrature modulating signal;

a level detecting unit which detects an output level of the adder;

a variable voltage source which generates an I dc signal and a Q dc signal corresponding to the input I signal and the input Q signal; and a control unit which receives a detection signal from the level detecting unit and controls the phase variable unit such that a phase difference between the first carrier signal and the second carrier signal is made to be 90°, wherein the control unit which causes the variable voltage source to generate four pairs of the I dc signal and the Q dc signal for causing that the detection signal from the level detecting unit is made to be a predetermined value, and which are different from each other, calculates a quadrature error between the first carrier signal and the second carrier signal which are included in the quadrature modulating signal output from the adder, by using the I dc signal and the Q dc signal, and controls the phase variable unit such that the quadrature error is made to be zero.

* * * * *